United States Patent Office 3,121,742
Patented Feb. 18, 1964

3,121,742
METHOD OF PREPARING MIXED ALKYLHALOBORINES
Ellis I. Hormats, Rochester, N.Y., and Samuel Witz, West Covina, and Herman Graff, Los Angeles, Calif., assignors to Aerojet-General Corporation, Azusa, Calif., a corporation of Ohio
No Drawing. Filed Mar. 23, 1959, Ser. No. 801,389
6 Claims. (Cl. 260—543)

This invention relates to a new and improved method of preparing mixed alkylhaloborines of the general formula $RBX_2$ or $R_2BX$, wherein R is an alkyl radical and X is a halogen radical.

Previously known methods of synthesizing mixed alkylhaloborines have been costly and inefficient in that they have required high temperatures and product yields have been low. The method of the present invention, on the other hand, is operative at moderate temperatures, such as room temperatures, and its use results in a substantially quantitative product yield.

The mixed alkylhaloborines prepared by the method of this invention are useful as high energy fuels for airplanes and missiles, being particularly valuable for use in conventional liquid bi-propellant rockets. When used for this purpose, the alkylhaloborines are burned with an oxidizer, such as fuming nitric acid, in a liquid combustion chamber. The gases thus produced are expelled through an exhaust nozzle and thrust is thereby imparted to the combustion chamber, resulting in forward motion of the rocket. Mixed alkylhaloborines can be utilized in this fashion for rocket propulsion purposes by employing them as the fuel in the method taught in assignee's United States Patent No. 2,771,739.

We have found that mixed alkylhaloborines are produced in good yield by reacting borontrihalide with trialkylboron in the presence of a minor amount of dihaloborine which acts as a catalyst for the reaction. The reaction proceeds in accordance with the general reaction scheme set forth below:

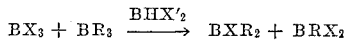

$$BX_3 + BR_3 \xrightarrow{BHX'_2} BXR_2 + BRX_2$$

where X and X' are halogen radicals, which may or may not be identical, and R is an alkyl radical. The molar ratios of $BRX_2$ and $BXR_2$ formed in the above reaction will vary, depending on the molar ratio of $BX_3$ to $BR_3$ employed.

To more clearly illustrate our invention, the following example is presented. It should be understood that this example merely serves as a means of illustrating the invention and should not be construed as limiting the invention to the particular conditions set forth therein.

EXAMPLE I

Preparation of Methyldichloroborine

A mixture of borontrichloride and trimethylboron, in a molar ratio of two of the former to one of the latter, were reacted by confining the mixture with dichloroborine, in an amount equal to one percent of the total mixture on a volume basis, for a period of about 24 hours at room temperature. A substantially quantitative yield of methyldichloroborine was obtained as the product.

Reaction temperature is not critical in the practice of this invention, the only effect of temperature variation being a corresponding increase or decrease in reaction rate. However, one of the advantages of the present invention is the fact that mixed alkylhaloborines can be synthesized at relatively low temperatures, rather than at the high temperatures previously required for the synthesis of these compounds. For reasons of economy, it is preferred to conduct the reaction at room temperature.

We have discovered that when a molar ratio of borontrihalide to trialkylboron of 2:1 or higher is employed in the practice of our invention, the corresponding alkyldihaloborine product is obtained in substantially quantitative yield. On the other hand, at lower molar ratios, as for example at a ratio of 1:1, the corresponding dialkylhaloborine is formed in addition to the alkyldihaloborine. Thus, at molar ratios lower than 2:1, mixtures of dialkylhaloborines and alkyldihaloborines are produced in varying proportions depending on the ratios of reactants employed. Where mixtures of mixed alkylhaloborines are produced in our process, separation can be achieved, if desired, by fractional condensation or other means well known to those skilled in the art.

The dihaloborines which serve as catalysts for the reaction of this invention can be any of the dihaloborines such as dichloroborine, dibromoborine, etc. These dihaloborines are prepared by reacting borontrihalides, such as borontrichloride, with halogen, as more fully disclosed in assignee's copending United States patent application Serial No. 801,391, filed concurrently with the present application.

The amount of dihaloborine to be used is not limited to a critical range in the practice of this invention. Any amount of dihaloborine is operative but it is preferable, for reasons of economy, to employ minor amounts thereof. We have found that an amount of dihaloborine equivalent to about 1% of the volume of the total reaction mixture is optimum for purposes of our invention.

It will be appreciated that a wide variety of mixed alkylhaloborines can be prepared by the method taught herein. For example, a mixture of tributylboron and borontriiodide in a molar ratio of 1:1 reacts, in the presence of a dihaloborine such as difluoroborine as a catalyst, to yield butyldiiodoborine and dibutyliodoborine. It is also within the scope of our invention to employ mixtures of reactants such that final products having more than one type of halogen or alkyl radical are formed. For example, a mixture of borontrifluoride, borontrichloride, and tripropylborine reacts, in the presence of a dihaloborine such as diiodoborine as a catalyst, to yield propyldifluoroborine, propyldichloroborine, and propylfluorochloroborine as products. Also, a mixture of trimethylborine, triethylborine and boron tribromide reacts, in the presence of a dihaloborine such as dichloroborine as a catalyst, to yield, among other mixed alkylhaloborine products, methylethylbromoborine.

Other mixed alkylhaloborines within the scope of our invention can be prepared by reacting appropriate starting materials in the presence of dihaloborines, according to the method taught herein.

We claim:

1. The method of preparing an alkyldihaloborine which comprises reacting a borontrihalide with a trialkylboron, in the presence of a dihaloborine as a catalyst.

2. The method of preparing alkyldihaloborines which comprises reacting a borontrihalide with a trialkylboron, at a molar ratio of about two to one, in the presence of a minor amount of a dihaloborine as a catalyst.

3. The method of simultaneously preparing alkyldihalobrines and dialkylhaloborines which comprises reacting a trialkylboron with a borontrihalide, at a molar ratio of about one to one, in the presence of a minor amount of a dihaloborine as a catalyst.

4. The method of preparing methyldichloroborine which comprises reacting borontrichloride with trimethylboron in the presence of a dihaloborine as a catalyst.

5. The method of preparing methyldichloroborine which comprises reacting borontrichloride with trimethylboron, at a molar ratio of about two to one, in the presence of about one percent by volume, of the reactant mixture, of dichloroborine as a catalyst.

6. The method of preparing butyldiiodoborine which comprises reacting tributylboron with borontriiodide, in the presence of a minor amount of a dihaloborine as a catalyst.

References Cited in the file of this patent

Goubeau, FIAT Reviews of German Science, Inorganic Chemistry, vol. I, pages 215–38 (1948).